(12) United States Patent　(10) Patent No.: US 6,429,981 B2
Ishii et al.　(45) Date of Patent: Aug. 6, 2002

(54) OPTICAL PICKUP APPARATUS

(75) Inventors: Ko Ishii; Shinichi Takahashi; Mitsutoshi Sugano; Hirokatsu Nagatake; Aki Yoshioka; Makoto Kawamura; Akira Miura; Masayuki Koyama, all of Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/782,525

(22) Filed: Feb. 14, 2001

(30) Foreign Application Priority Data

Feb. 22, 2000　(JP) ........................................ 2000-044627

(51) Int. Cl.[7] ................................................. G02B 7/02
(52) U.S. Cl. ........................ 359/813; 359/824; 359/823; 359/814
(58) Field of Search ................................. 359/813, 814, 359/823, 824; 369/44.15

(56) References Cited

U.S. PATENT DOCUMENTS 5,161,040 A * 11/1992 Yokoyama et al. ........... 359/19

* cited by examiner

Primary Examiner—Ricky Mack
(74) Attorney, Agent, or Firm—Morgan, Lewis & Bockius LLP

(57) ABSTRACT

An optical pickup apparatus includes a semiconductor laser device having a plurality of light emitting portions for emitting laser beams having different wavelengths on a substrate for emitting a laser beam from one of the plurality of light emitting portions in response to a light emitter selecting instruction in the same emitting direction. The laser beam emitted from the semiconductor laser device is converged by an objective lens and led to a recording surface of an optical disk, and the objective lens is moved to one of a plurality of different positions in a radial direction of the optical disk, corresponding to the selected light emitting portion.

5 Claims, 12 Drawing Sheets

OPTICAL PICKUP APPARATUS

BACKGROUND OF THE INVENTION

1. Field of the Invention

The present invention relates to an optical pickup apparatus which can emit a plurality of laser beams with different wavelengths to read recording information from a plurality of types of optical disks having different recording densities.

2. Description of the Related Background Art

Generally, a semiconductor laser device is used as a light source of an optical pickup apparatus for playing an optical information recording medium such as CD, DVD, or the like.

To play back the recording medium, the light emission wavelength and the numerical aperture (NA) of an objective lens of the semiconductor laser device which is used for playing a CD and for playing a DVD are different from each other. For example, in the case of the DVD, the wavelength is equal to 650 nm and the NA is equal to 0.6 and, in the case of the CD, the wavelength is equal to 780 nm and the NA is equal to 0.45.

Figure 1:
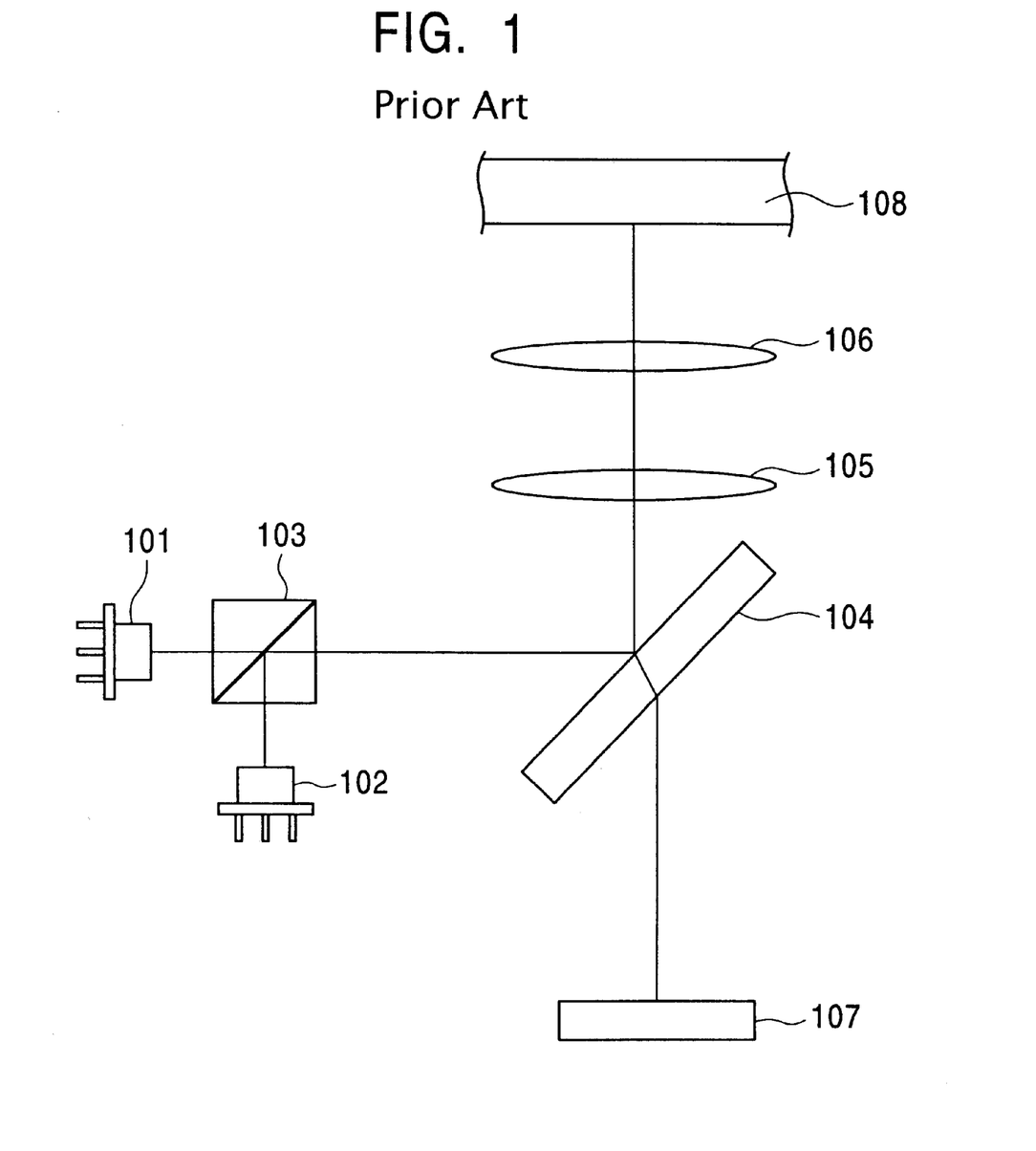
FIG. 1 is a configuration diagram illustrating an example of a conventional optical pickup apparatus.

To play different kinds of discs such as CD, DVD, and the like by one disc player, therefore, an optical pickup apparatus having therein light sources of two wavelengths of 650 nm and 780 nm is being used. FIG. 1 shows an example of the optical pickup apparatus.

According to the optical pickup apparatus shown in FIG. 1, a laser device 1 for emitting a laser beam having a wavelength of 650 nm, a laser device 2 for emitting a laser beam having a wavelength of 780 nm, a synthesizing prism 3, a half mirror 4, a collimator lens 5, and an objective lens 6 are sequentially arranged. Further, a photodetector 7 is arranged on another optical axis which is branched from the half mirror 4. In the construction, since an optical system starting with the synthesizing filter 3 and extending to an optical disc 8 is used in common for the CD and DVD, in both cases, the light emitted from the laser device passes through the synthesizing filter 3 and, thereafter, is guided toward the optical disc 8 along an optical axis Y. The objective lens 6 used here is a lens having double focal points and different focal positions, provided in accordance with the two wavelengths. A spherical aberration which is caused by different thicknesses of surface substrates of the CD and DVD can be, consequently, suppressed.

In the construction, however, since a synthesizing prism or the like is needed, a large number of parts is required and the costs of production are high. Further, because it is necessary to match the positions of the two laser devices and the synthesizing prism, the construction becomes complicated, and it is difficult to make adjustments to the device.

SUMMARY OF THE INVENTION

In consideration of the problems, it is an object of the present invention to provide an optical pickup apparatus and a laser diode chip, in which a construction of the apparatus for using a plurality of laser beams having different wavelengths can be simplified and miniaturized.

The optical pickup apparatus of the present invention is an optical pickup apparatus comprising a light emitting device having a plurality of light emitting portions for emitting laser beams having different wavelengths on a substrate, for emitting a laser beam from one light emitting portion selected from the plurality of light emitting portions in the same emitting direction in response to a light emitter selecting instruction; at least one objective lens for converging the laser beam emitted from the light emitting device to irradiate a recording surface of an optical disk; and a lens driving device for moving the objective lens to one position within a plurality of different positions from one another in a radial direction of the optical disk, corresponding to the light emitting portion selected by the light emitter selecting instruction.

DETAILED DESCRIPTION OF THE PREFERRED EMBODIMENT

An embodiment of the present invention will hereinafter be described in detail with reference to the drawings.

Figure 2:
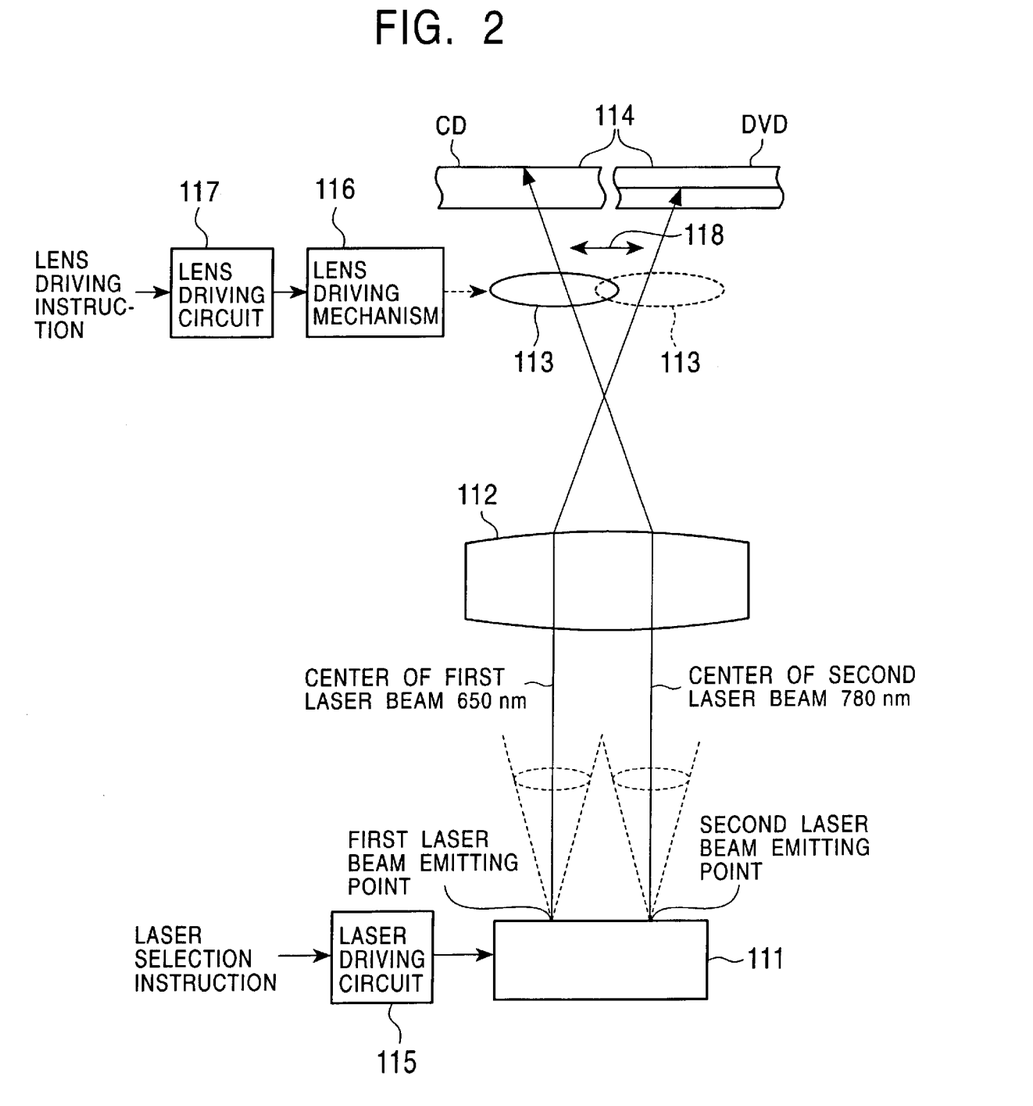
FIG. 2 is a diagram generally illustrating an optical pickup apparatus of the present invention.

FIG. 2 generally illustrates an optical system of an optical pickup apparatus according to the present invention. The optical pickup apparatus has a semiconductor laser device 111 for emitting two laser beams having different wavelengths. A semiconductor laser device 111 separately emits a first laser beam having a wavelength of 650 nm and a second laser beam having a wavelength of 780 nm from different light emitting points in the same emitting direction. A spacing L between the light emitting points is approximately 100 μm.

The optical pickup apparatus is configured such that the laser beam emitted from the semiconductor laser device 111 passes through a collimator lens 112 and an objective lens 113 in that order and reaches a disk 114. As the disk 114, a DVD and a CD (including a CD-R) are used, and either disk used is set on a turn table, not shown.

The semiconductor laser device 111 is driven by a laser driving circuit 115. The laser driving circuit 115 drives the semiconductor laser device 111 to selectively emit either the first laser beam or the second laser beam in accordance with the type of the disk 114 from which information is read. Specifically, the laser driving circuit 115 drives the semiconductor laser device 111 such that the semiconductor laser device 111 emits the first laser beam having the wavelength of 650 nm when the disk 114 is a DVD, and the semiconductor laser device 111 emits the second laser beam having the wavelength of 780 nm when the disk 114 is a CD.

The objective lens 113 is movable in a tracking direction 118, i.e., in the disk radial direction by a lens driving mechanism 116. The lens driving mechanism 116 can be used as a known lens actuator mechanism for performing focusing and tracking servo adjustments. A lens driving circuit 117 is connected to the lens driving mechanism 116. The lens driving circuit 117 generates a lens moving instruction in accordance with the type of disk 114 from which information is read, and the lens driving mechanism 116 moves the objective lens 113 in response to the lens moving instruction.

When the disk 114 is a DVD, the semiconductor laser device 111 emits the first laser beam having the wavelength of 650 nm. The objective lens 113 is moved to a first position such that the center of the first laser beam substantially aligns with the optical axis (center axis) of the objective lens 113. On the other hand, when the disk 114 is a CD, the semiconductor laser device 111 emits the second laser beam having the wavelength of 780 nm. The objective lens 113 is moved to a second position such that the center of the second laser beam substantially aligns with the optical axis of the objective lens 113.

Figure 3:
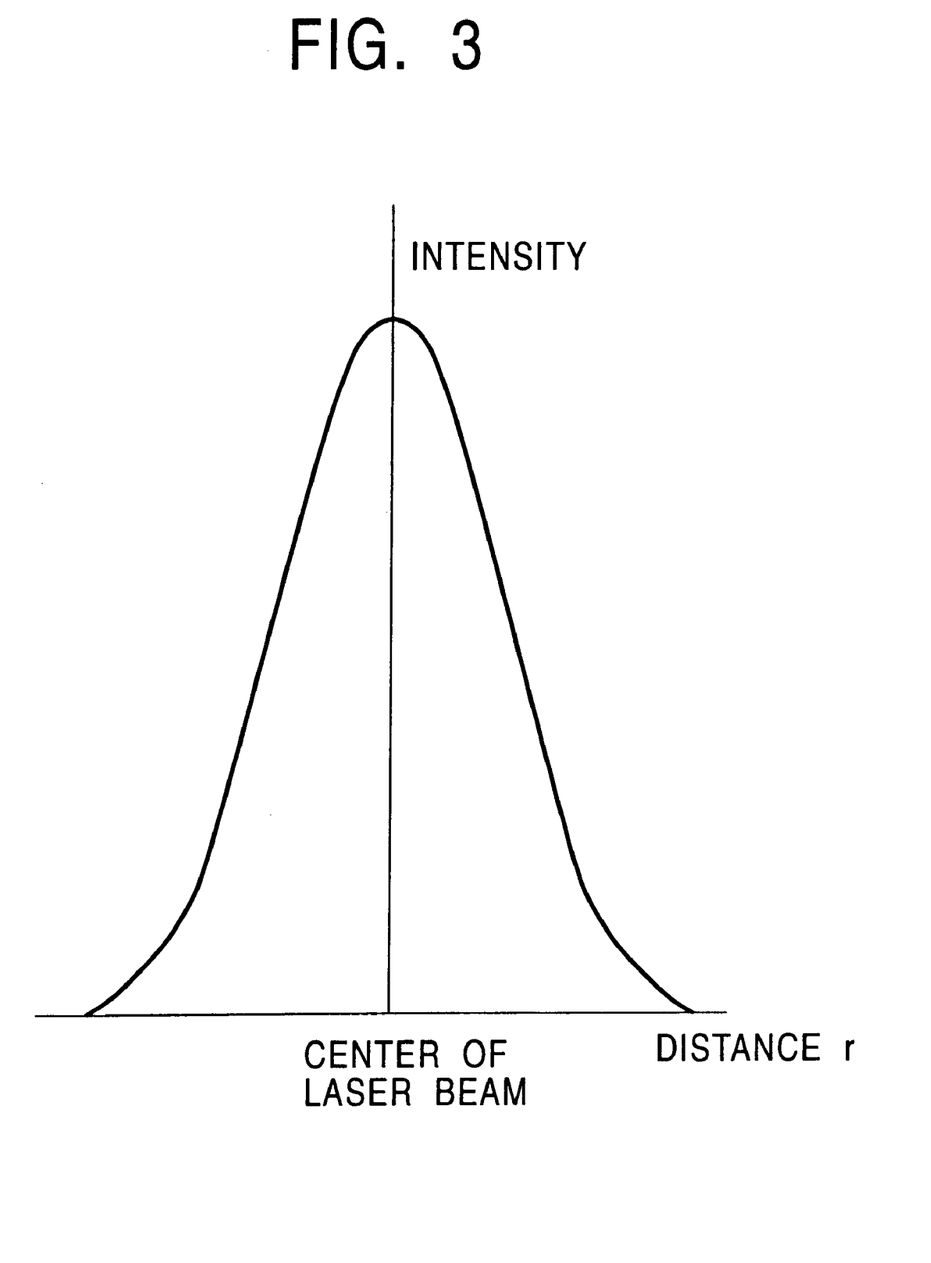
FIG. 3 is a diagram showing a Gaussian distribution of a laser beam.

An intensity distribution of the laser beam emitted from the semiconductor laser device 111 is a Gaussian distribution. In the Gaussian distribution, the intensity I of the laser beam is maximum at the center of the laser beam and becomes lower in accordance with a distance r from the center, as illustrated in FIG. 3. By moving the objective lens 113 as described above, the center of the laser beam can be substantially aligned with the optical axis of the objective lens 113 even when either the first beam or the second beam is emitted. It is therefore possible to effectively utilize the intensity of the laser beam irradiated to a recording surface 114a of the disk 114 whether it is a DVD or a CD.

A tracking servo adjustment and a focus servo adjustment upon reading information from the disk 114 are performed with reference to the first position of the objective lens 113 when the disk 114 is a DVD, and with reference to the second position of the objective lens 113 when the disk 114 is a CD.

Figure 4:
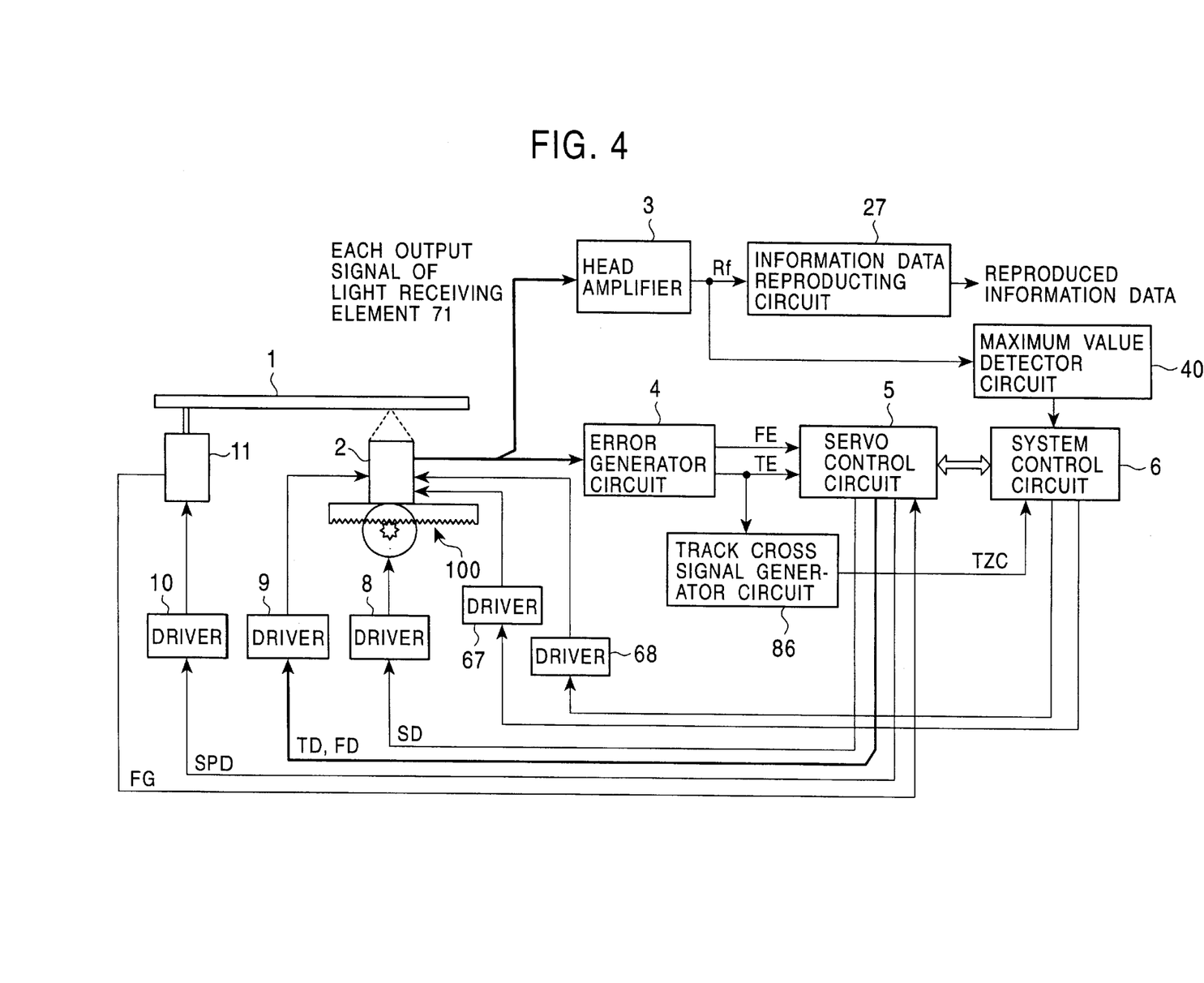
FIG. 4 is a block diagram illustrating a disk player to which the present invention is applied.

Next, the present invention will be described in a more specific manner. FIG. 4 is a diagram illustrating the general configuration of an optical disk player to which the present invention is applied.

In the optical disk player illustrated in FIG. 4, the types of optical disks 1 which can be played are CD, CD-R and DVD. Here, the CD-R is treated identically to the CD.

Figure 5:
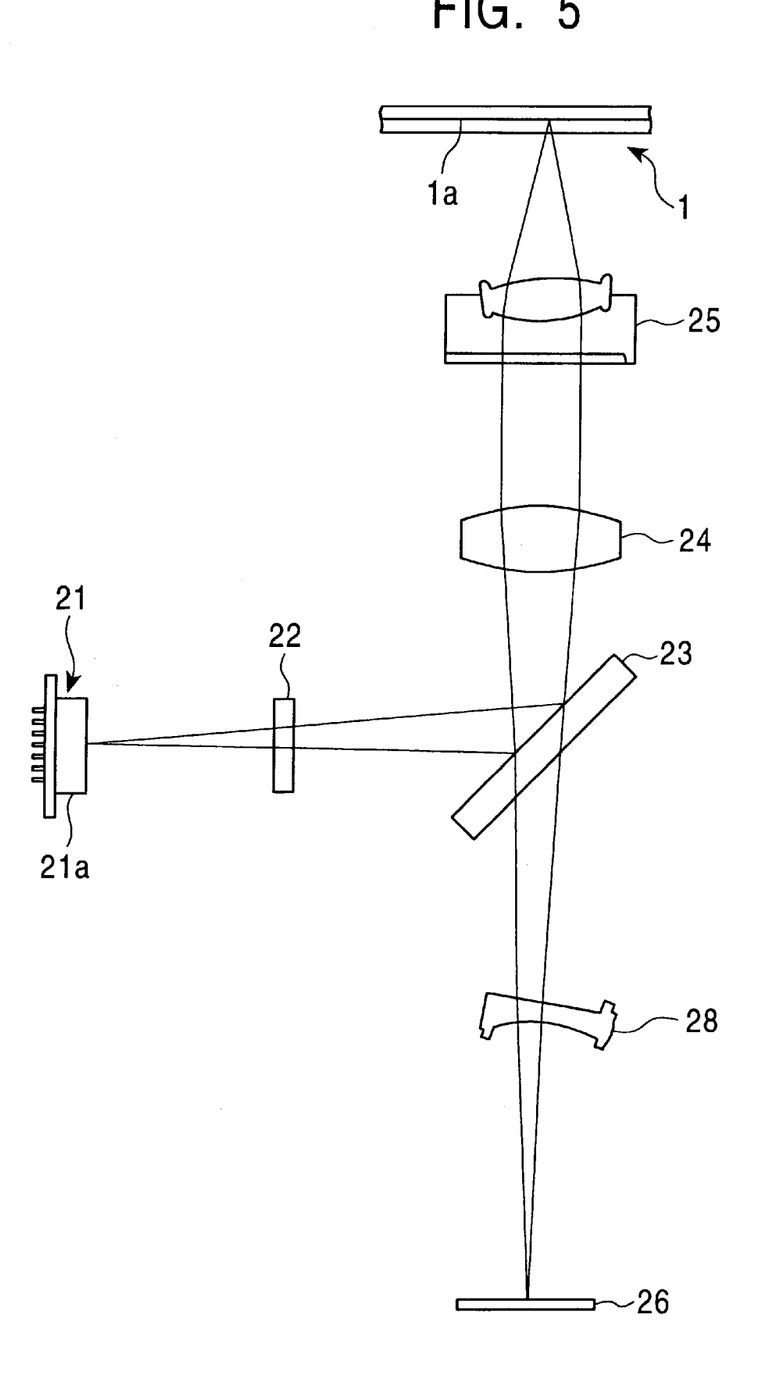
FIG. 5 is a diagram illustrating the configuration of the optical pickup apparatus of the present invention, and a path for a laser beam when an optical disk is a DVD.
Figure 6:
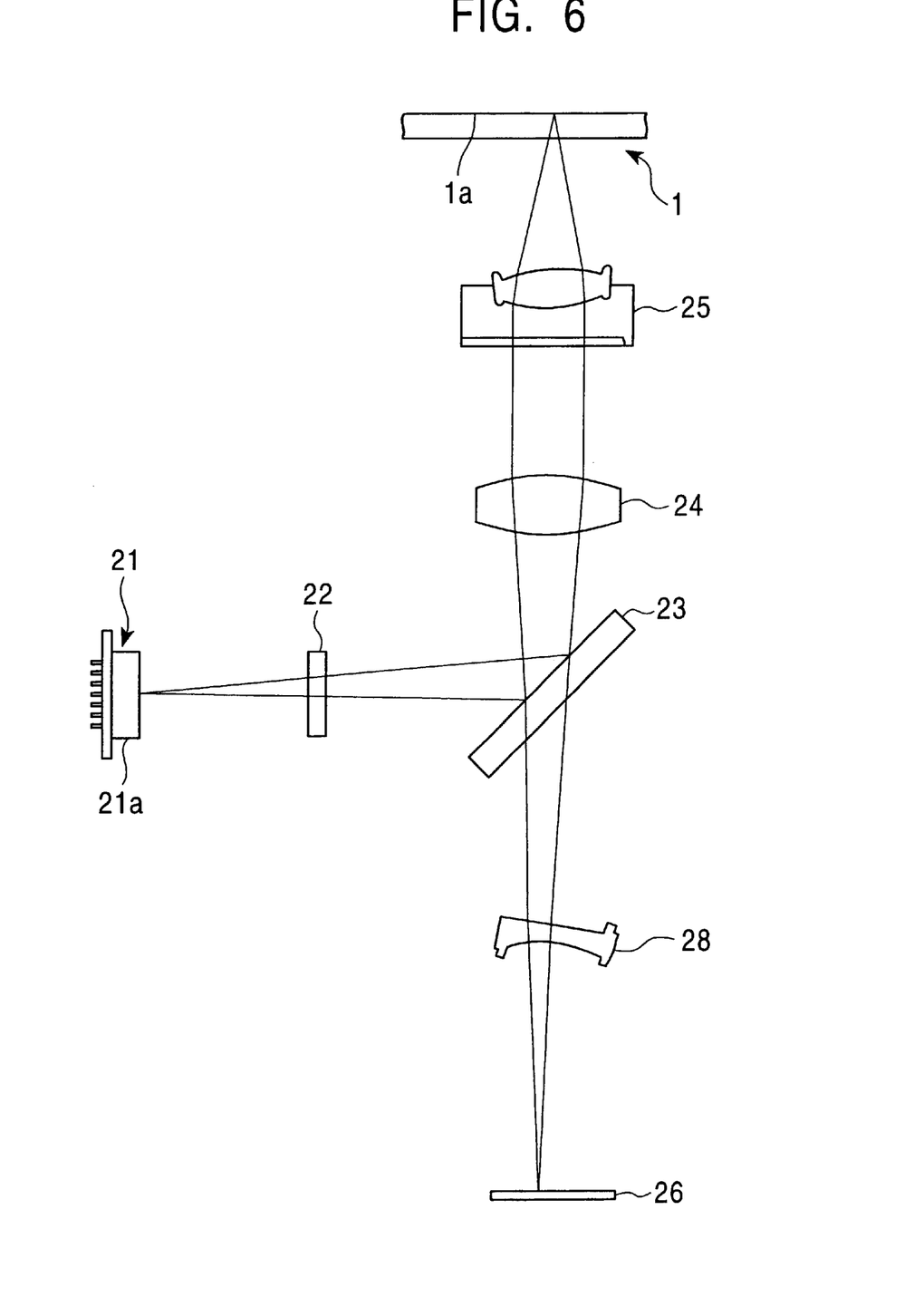
FIG. 6 is a diagram illustrating a path for a laser beam when an optical disk is a CD.

A pickup apparatus 2 has a semiconductor laser device 21 for emitting a first laser beam having a wavelength of 650 nm and a second laser beam having a wavelength of 780 nm, as illustrated in FIGS. 5 and 6. Also, in the optical pickup apparatus, a laser beam emitted from the semiconductor laser device 21 reaches a half mirror (beam splitter) 23 through a grating 22. The grating 22 is provided for separating the laser beam into a plurality of light flux (0th order light, ± primary light). The 0th order light is for focus servo control, and ± primary light is for tracking servo control. The half mirror 23 reflects the laser beam substantially at an angle of 90° with respect to the incidence thereof. The direction of the reflected laser beam is in the direction of an optical disk 1. Between the half mirror 23 and the optical disk 1, a collimator lens 24 and an objective lens 25 are disposed.

The collimator lens 24 collimates the laser beam from the half mirror 23 and supplies the collimated laser beam to the objective lens 25. The objective lens 25 is a bifocal lens which converges the collimated laser beam on a recording surface 1a of the disk 1. The laser beam reflected by the recording surface 1a of the disk 1, through the objective lens 25, is collimated by the collimator lens 24, and linearly passes through the half mirror 23. In the direction of the optical axis passing through the half mirror 23, a cylindrical lens 28 and a photodetector 26 are disposed in that order. The cylindrical lens 28 is an astigmatism generating element for creating astigmatism.

FIG. 5 illustrates the case where a DVD is used as the optical disk 1, where the first laser beam having a wavelength of 650 nm is emitted from the semiconductor laser device 21. FIG. 6 illustrates the case where a CD (including a CD-R) is used as the optical disk 1, where the second laser beam having a wavelength of 780 nm is emitted from the semiconductor laser device 21.

Figure 7:
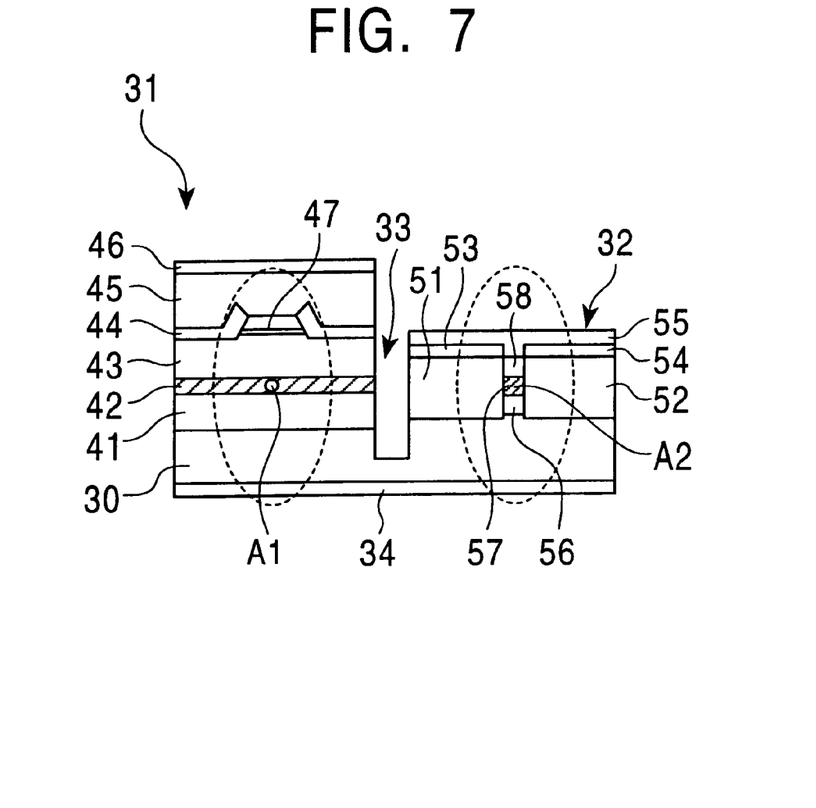
FIG. 7 is a cross-sectional view illustrating a semiconductor laser device chip.

FIG. 7 illustrates a cross section of a chip of the semiconductor laser device 21. As illustrated in FIG. 7, the semiconductor laser device 21 is formed in one chip, and has a first light emitter 31 having a first light emitting point A1 for emitting the first laser beam having a wavelength of 650 nm, and a second light emitter 32 having a second light emitting point A2 for emitting the second laser beam having the wavelength of 780 nm on one major surface of a single n-type GaAs substrate 30 with a separating groove 33 interposed therebetween. The first light emitter 31 and the second light emitter 32 are in a laminate structure, as described later. Also, the semiconductor laser device 21 has a back electrode 34, on the other major surface of the substrate 30, which is a common electrode for both light emitters 31, 32. A light emitting surface of the first light emitter 31 which has the light emitting point A1, and a light emitting surface of the second light emitter 32 which has the light emitting point A2 are oriented in the same emitting direction.

The first light emitter 31 has an n-type AlGaInP clad layer 41, a distortion quantum well active layer 42, a p-type AlGaInP clad layer 43, an n-type GaAs layer 44, a p-type GaAs layer 45, and an electrode 46 in order from the GaAs substrate 30. The cross section of the clad layer 43 is formed such that its central portion is trapezoidal. The n-type GaAs layer 44 is formed to cover the clad layer 43 except for a top surface of the trapezoid. A p-type GaInP layer 47 is formed on the top surface of the trapezoid. The first light emitting point A1 is positioned in the distortion quantum well active layer 42.

The second light emitter 32 is in a so-called double heterodyne structure, and has a pair of n-type AlGaAs buried layers 51, 52 with a predetermined spacing therebetween on the GaAs substrate 30. On each of the pair of n-type AlGaAs buried layers 51, 52, an electrode 55 is provided through insulating layers 53, 54. On the GaAs substrate 30 between the buried layers 51, 52, an n-type AlGaAs clad layer 56, an undoped GaAs active layer 57, a p-type AlGaAs clad layer 58 are laminated in order. The clad layer 58 is in contact with the electrode 55. The second light emitting point A2 is positioned in the active layer 57. The spacing between the optical axis from the first light emitting point A1 and the optical axis from the second light emitting point A2 is, for example, 100 μm.

The semiconductor laser device 21 is fixed on an insulating submount, and these are further covered with a casing member 21a as illustrated in FIGS. 5 and 6.

Figure 8:
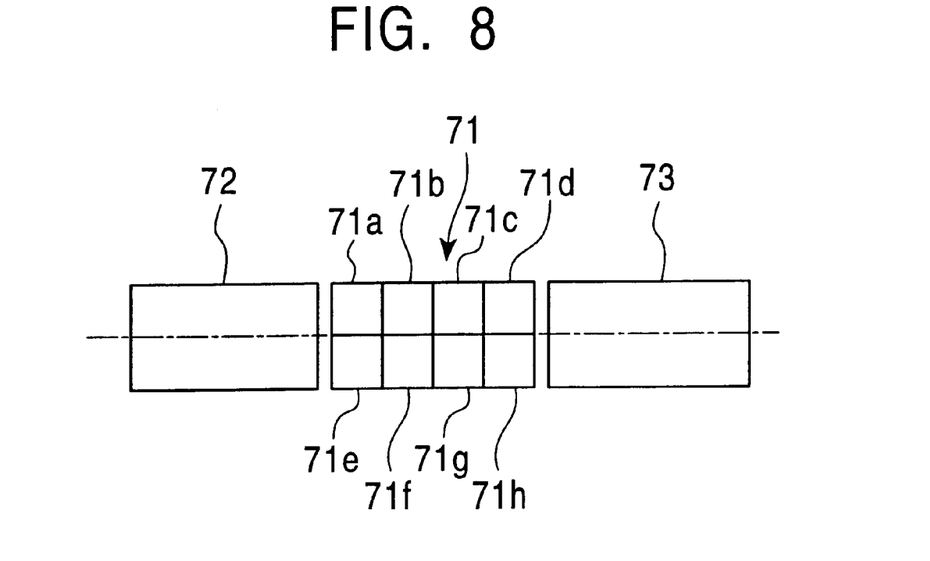
FIG. 8 is a diagram illustrating an arrangement of respective light receiving surfaces of a light receiving element.

The photodetector 26 has three independent light receiving elements 71–73 as illustrated in FIG. 8. Light receiving surfaces of the light receiving elements 71–73 are positioned on a plane perpendicular to the optical axis, and each have a rectangular shape. Also, the light receiving elements 71–73 are arranged in a line in their longitudinal direction. The light receiving element 71 is positioned between the light receiving elements 72, 73, and receives 0th order light formed by the grating 22. The light receiving element 71 has its light receiving surface divided into eight, and is comprised of eight light receiving elements 71a–71h. Specifically, the light receiving surface of the light receiving element 71 is divided into eight by a bisecting division line in the longitudinal direction and quadrisecting division lines perpendicular to that division line. An output signal corresponding to a received light intensity on the light receiving surface is generated from each of the eight light receiving elements 71a–71h of the light receiving element 71. In each of the light receiving elements 72, 73, the light receiving surface is not divided, and an output signal is generated corresponding to a received light intensity on the light receiving surface. The light receiving element 72 receives one of reflected light of ± primary light formed by the grating 22, and the light receiving element 73 receives the other reflected light of the ± primary light. In FIG. 8, a one-dot chain line is a center line common to the respective light receiving surfaces of the light receiving elements 71–73.

As illustrated in FIG. 4, the first light emitter 31 of the semiconductor laser device 21 is driven by a driver 67, and the second light emitter 32 is driven by a driver 68. A system control circuit 6 is connected to the drivers 67, 68. The system control circuit 6 supplies a driving instruction to either one of the drivers 67 and 68 in accordance with the type of the disk 1 for playing the disk 1. The operation for discriminating the type of the disk 1 will be described later.

The pickup apparatus 2 is also provided with a tracking actuator (not shown) for offsetting the position of the beam spot in the disk radial direction, and a focusing actuator (not shown) for adjusting a focus position of the beam spot.

Output signals from the light receiving elements 71–73 are supplied to a head amplifier 3 and an error generator circuit 4. The head amplifier 3 produces an RF signal in accordance with the output signal of the light receiving element 71 as described later, and amplifies this which is supplied to an information data reproducing circuit 27 as an RF signal Rf.

The information data reproducing circuit 27, after digitizing the output RF signal Rf of the head amplifier 3, applies demodulation and error correcting processing to recover data recorded on the optical disk 1. Further, the information data reproducing circuit 27 performs information (video, audio, computer data) demodulating processing on the recovered data to reproduce information data which is output as reproduced information data.

Figure 9:
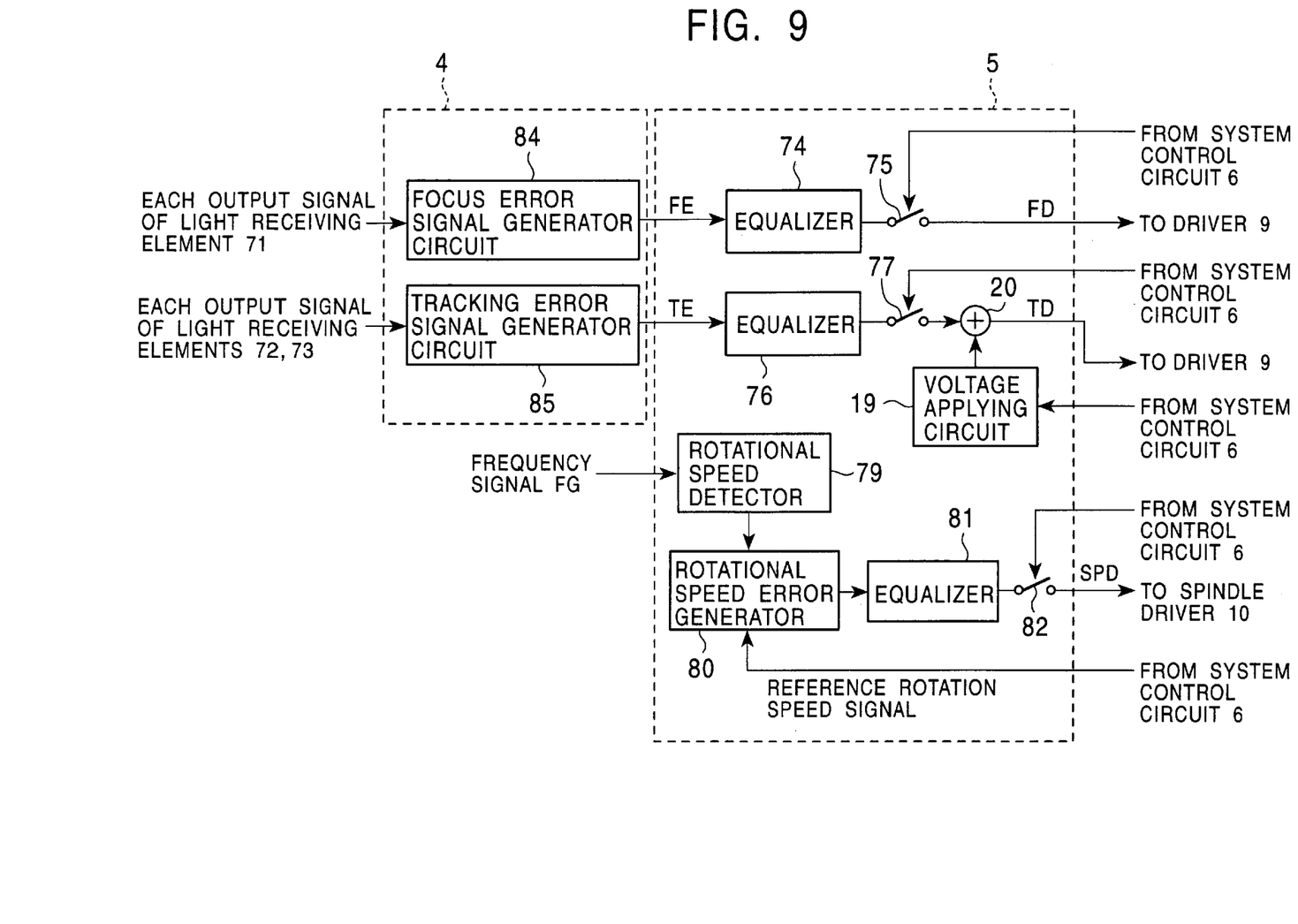
FIG. 9 is a block diagram illustrating the internal configuration of an error generator circuit and a servo control circuit in FIG. 4.

The error generator circuit 4 has a focus error signal generator circuit 84 and a tracking error signal generating circuit 85, as illustrated in FIG. 9. The focus error signal generator circuit 84 generates a focus error signal FE indicative of an error of the focus of a beam spot on the recording surface 1a of the optical disk 1 based on the respective output signals of the light receiving element 71, and the tracking error signal generator circuit 85 generates a tracking error signal TE indicative of an error of the beam spot on the optical disk 1 in the disk radial direction from the center of the track based on the respective output signals of the light receiving elements 72, 73. These error signals are supplied to a servo control circuit 5. Further, the error generator circuit 4 supplies the tracking error signal TE to a track cross signal generator circuit 86 as well.

The track cross signal generator circuit 86 generates a binary track cross signal TZC which is at logical level "1" when the signal level of the tracking error signal TE produced during a track jump of the pickup apparatus 2 is higher than a predetermined level, and at logical level "0" when lower, and supplies this signal to the system control circuit 6. In other words, the track cross signal generator circuit 86 outputs the track cross signal TZC such that the logical level transitions, for example, to "0," "1" and "0" each time the pickup 2 crosses the recording track on the optical disk 1 during the track jump. The track cross signal TZC is supplied to the system control circuit 6.

In the servo control circuit 5, as illustrated in FIG. 9, a rotational speed detector 79 is supplied with a frequency signal FG which is an alternating current signal indicative of a current rotational frequency of a spindle motor 11 for rotating the optical disk 1 through a turn table. The rotational speed detector 79 generates a rotational speed signal indicative of a rotational speed of the spindle corresponding to the frequency signal FG, and the rotational speed signal is supplied to a rotational speed error generator 80. The rotational speed error generator 80 generates a rotational speed error signal indicative of a difference between the rotational speed signal and a reference rotation speed signal supplied from the system control circuit 6, and supplies the rotational error signal to an equalizer 81. From the equalizer 81, a spindle driving signal SPD is generated from the rotational speed error signal, and the spindle driving signal SPD is supplied to the spindle motor 11 through a driver 10 when a switch 82 is on. The spindle motor 11 drives the optical disk 1 to rotate at a rotational speed in accordance with the spindle driving signal SPD. An alternating current generator (not shown) provided in the spindle motor 11 supplies the servo control circuit 5 with the frequency signal FG corresponding to the rotational frequency at a current time. With the spindle servo system, the spindle motor 11 is driven to rotate at a rotational speed indicated by the reference rotational speed signal supplied from the system control circuit 6.

Also, in the servo control circuit 5, the focus error signal FE is supplied to the equalizer 74, and a focusing driving signal FD is generated from the equalizer 74, and is supplied to a driver 9 when a switch 75 is on. The driver 9 drives a focusing actuator provided in the pickup apparatus 2 in accordance with the focusing driving signal FD, and the focusing actuator operates to adjust the focus position of a beam spot irradiated to the disk 1.

Further, in the servo control circuit 5, the tracking error signal TE is supplied to an equalizer 76, and a tracking driving signal TD is generated from the equalizer 76 and supplied to the driver 9 through an adder 20 when a switch 77 is on. The driver 9 drives a tracking actuator provided in the pickup apparatus 2 in accordance with the tracking driving signal TD, and the tracking actuator offsets the position of the beam spot irradiated to the disk 1 in the disk radial direction by a portion corresponding to a driving current by the tracking driving signal TD.

Each of the switches 75, 77, 82 is turned on/off in response to an instruction from the system control circuit 6. The switch 75 is turned on during focus servo control; the switch 77 is turned on during tracking servo control; and the switch 82 is turned on during spindle servo control.

Further, though not shown in FIG. 9, the servo control circuit 5 generates a slider driving signal SD based on the tracking error signal TE and supplies this to a slider 100 through a driver 8. In this way, the slider 100 carries the pickup 2 in the disk radial direction at a rotational speed corresponding to a driving current by the slider driving signal SD.

The system control circuit 6, which comprises a microcomputer, controls the entire disk player and generates a variety of control signals in accordance with manipulation inputs from a manipulation unit (not shown) by the user, and a current operating situation of the disk player. The servo control circuit 5 performs a servo control operation in accordance with a variety of control signals generated in the system control circuit 6.

In the foregoing configuration, the first laser beam or the second laser beam emitted from the semiconductor laser device 21 is separated into a plurality of light flux (0th order light, ± primary light) by the grating 22 as mentioned above, and then reflected by the half mirror 23. The laser beam reflected by the half mirror 23 is collimated by the collimator lens 24 and reaches the objective lens 25. The laser beam is converged on the recording surface 1a of the disk 1 by the objective lens 25 to form an elliptic light spot.

The beam modulated and reflected by an information pit on the recording surface 1a of the disk 1, passing through the objective lens 25 and the collimator lens 24, returns to the half mirror 23, and is separated here from the light path from the semiconductor laser device 21 and incident on the light receiving surfaces of the respective light receiving elements 71–73 of the photodetector 26 through the cylindrical lens 28. Reflected light of the 0th order light from the disk 1 reaches the light receiving element 71, and reflected light of the ± primary light from the disk 1 reaches the light receiving elements 72, 73.

Figure 10:
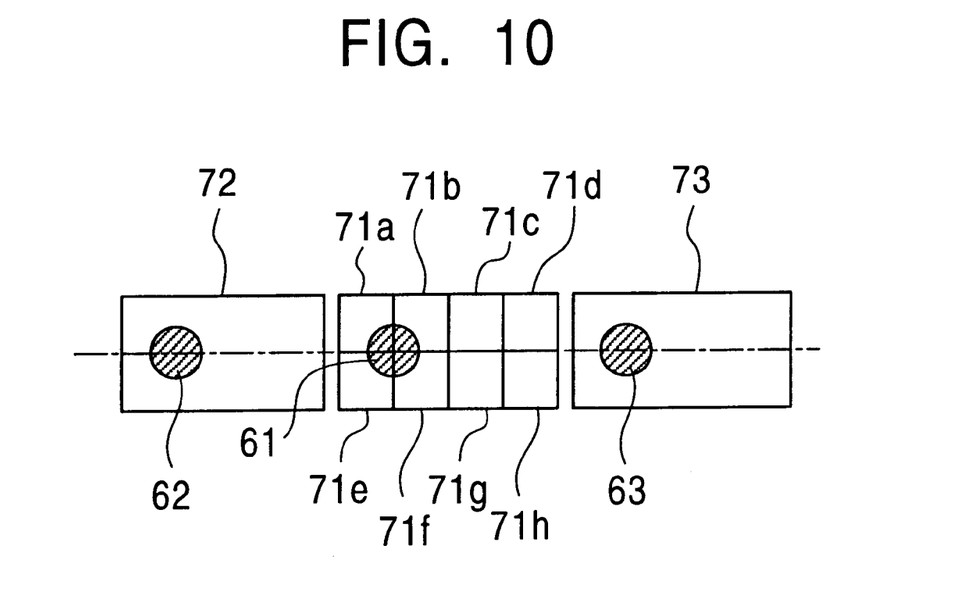
FIG. 10 is a diagram showing a position at which a light spot is formed on the light receiving surface in FIG. 8 by a first laser beam.

When the first laser beam having the wavelength of 650 nm is emitted from the first light emitter 21 and an elliptic light spot formed by the first laser beam on the recording surface 1a of the disk 1 is positioned on a track as focused thereon, circular light spots 61–63, as illustrated in FIG. 10, are formed on the respective light receiving surfaces of the light receiving elements 71–73 in the photodetector 26. On the light receiving element 71, the circular light spot 61 of the 0th order light is formed, centered on the center of a division intersection on the light receiving surfaces of the light receiving elements 71a, 71b, 71e, 71f, and on the light receiving elements 72, 73, the circular light spots 62, 63 of the ± primary light are formed at positions spaced by a predetermined distance from the light spot 61 of the 0th order light. In other words, on the light receiving surface of the light receiving element 72, the light spot 62 is positioned on the opposite side of the light receiving element 71 from the center in the longitudinal direction, and on the light receiving surface of the light receiving element 73, the light spot 63 is positioned proximal to the light receiving element 71 from the center in the longitudinal direction. Also, in a relation in which the direction of the division line of the light receiving surfaces of the light receiving elements 71a, 71e and the light receiving surfaces of 71b, 71f is in alignment with the track direction of the disk 1, spot light is formed on the light receiving surface.

Figure 11:
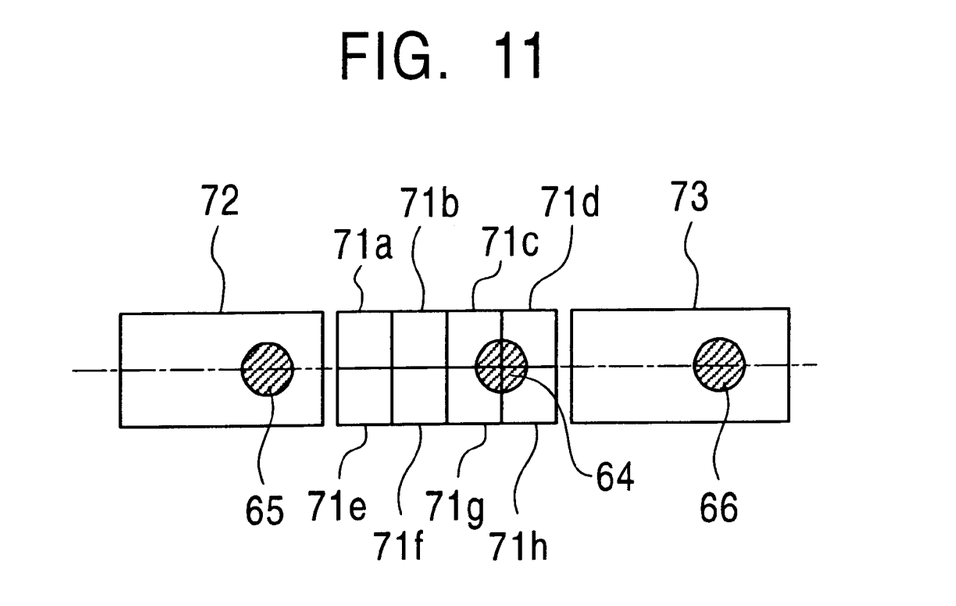
FIG. 11 is a diagram showing a position at which a light spot is formed on the light receiving surface in FIG. 8 by a second laser beam.

When the second laser beam having the wavelength of 780 nm is emitted from the second light emitter 22 and an elliptic light spot formed on the recording surface 1a of the disk 1 by the second laser beam is positioned on a track as focused thereon, circular light spots are formed on the light receiving surfaces of the light receiving elements 71–73, respectively, in the photodetector 26, as illustrated in FIG. 11. In the light receiving element 71, a circular light spot 64 of the 0th order light is formed, centered on the center of a division intersection on the light receiving surfaces of the light receiving elements 71c, 71d, 71g, 71h, and on the light receiving elements 72, 73, the circular light spots 65, 65 of the ± primary light are formed at positions spaced by a predetermined distance from the light spot on the light receiving element. In other words, on the light receiving surface of the light receiving element 72, the light spot is positioned proximal to the light receiving element 71 from the center in the longitudinal direction, and on the light receiving surface of the light receiving element 73, the light spot is positioned on the opposite side of the light receiving element 71 from the center in the longitudinal direction. Also, in a relation in which the direction of the division line of the light receiving surfaces of the light receiving elements 71c, 71g and the light receiving surfaces of 71d, 71h is in alignment with the track direction of the disk 1, spot light is formed on the light receiving surface.

An RF signal Rf and a focus error signal FE are generated in accordance with output signals of the respective light receiving elements 71a–71h of the photodetector 26. Also, a tracking error signal TE is generated in accordance with output signals of the respective light receiving elements 72, 73. Assuming that the output signals of the light receiving elements 71a–71h are Aa–Ah, respectively, in that order, and the output signals of the light receiving elements 72, 73 are B, C, respectively, in this order, Rf signal Fr is calculated as:

$$Rf=Aa+Ab+Ae+Af$$

in a head amplifier 3 when the first laser beam having the wavelength of 650 nm is emitted from the first emitter 21, the focus error signal FE is calculated as:

$$FE=(Aa+Af)-(Ab+Ae)$$

in the focus error signal generator circuit 84, and the tracking error signal TE is calculated as:

$$TE=B-C$$

in the tracking error signal generator circuit 85. When the second laser beam having the wavelength of 780 nm is emitted from the second light emitter 22, the RF signal Rf is calculated as:

$$Rf=Ac+Ad+Ag+Ah$$

in the head amplifier 3, the focus error signal FE is calculated as:

$$FE=(Ac+Ah)-(Ad+Ag)$$

in the focus error signal generator circuit 84, and the tracking error signal TE is calculated as:

$$TE=B-C$$

in the tracking error signal generator circuit 85.

The focus error signal FE is supplied to the driver 9 as a focusing driving signal FD through the equalizer 74 when the switch 75 is on. The driver 9, in according with to the focusing driving signal FD, forces the focusing actuator to move the objective lens 2 in its optical axis direction to adjust the focus position of a beam spot irradiated to the disk 1.

The tracking error signal TE is supplied to the driver 9 as a tracking driving signal TD through the equalizer 76 when the switch 77 is on. The driver 9, in accordance with the tracking driving signal TD, forces the tracking actuator to move the objective lens 25 in the disk radial direction to adjust the position of the beam spot irradiated to the disk 1 in the disk radial direction.

When the disk 1 is set on the turn table, the system control circuit 6 performs a disk type discriminating operation for discriminating the type of the disk.

Figure 12:
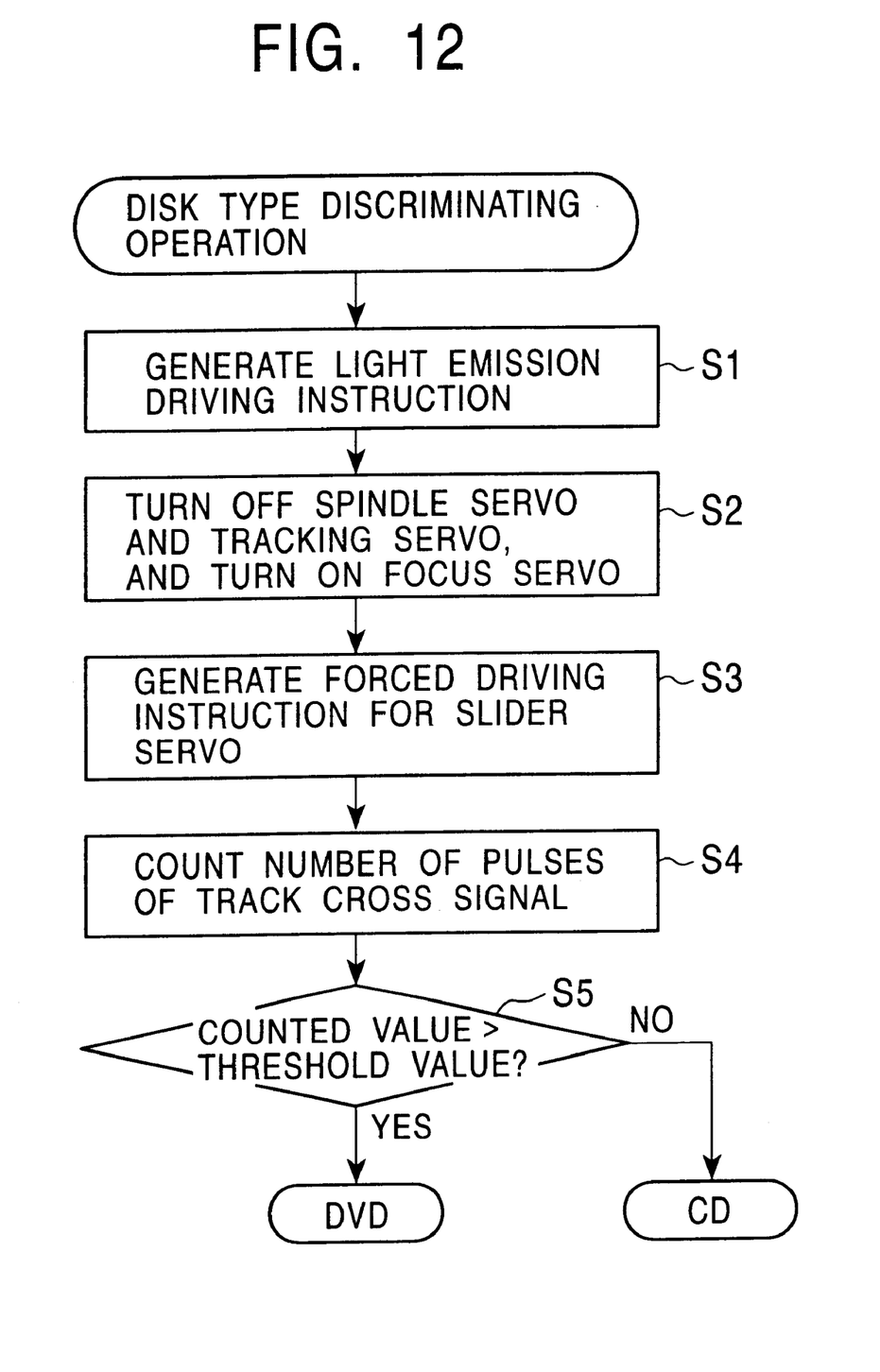
FIG. 12 is a flow chart illustrating a disk type discriminating operation.

In the disk type discriminating operation, the system control circuit 6 first generates a light emission driving instruction to the driver 67 or 68 (step S1), as illustrated in FIG. 12. For example, when the driver 67 is supplied with the light emission driving instruction, the driver 67 supplies a driving current between electrodes 34, 46 of the first light emitter 21 of the semiconductor laser device 21 in response to the light emission driving instruction, thereby emitting the first laser beam from the light emitting point A1 of the light emitter 21.

After execution of step S1, the system control circuit 6 turns off the spindle servo control, turns on the focus servo control, and turns off the tracking servo control (step S2). Specifically, the switch 75 is turned on, and switches 77 and 82 are turned off. Since only the focus servo control is operative, the focus of a beam spot by the laser beam is adjusted on the recording surface 1a of the disk 1.

The system control circuit 6 generates a forced driving instruction for the slider servo system to the servo control circuit 5 (step S3). In response to the forced driving instruction, the servo control circuit 5 supplies the driver 8 with a predetermined driving pulse to move the pickup apparatus 2 by a predetermined distance in the disk radial direction by the slider 100 for jumping tracks. Then, the number of pulses corresponding to "1" of the binary track cross signal generated from the track cross signal generator circuit 86 during the track jump period is counted (step S4). After execution of step S4, the counted number of pulses indicates the number of tracks during the track jump period, so that it is determined whether or not the counted value is larger than a predetermined threshold value (step S5). If the counted number of pulses>the predetermined threshold value, it is determined that the disk 1 is a DVD. If the counted number of pulses ≦the predetermined threshold value, it is determined that the disk is a CD.

Figure 13:
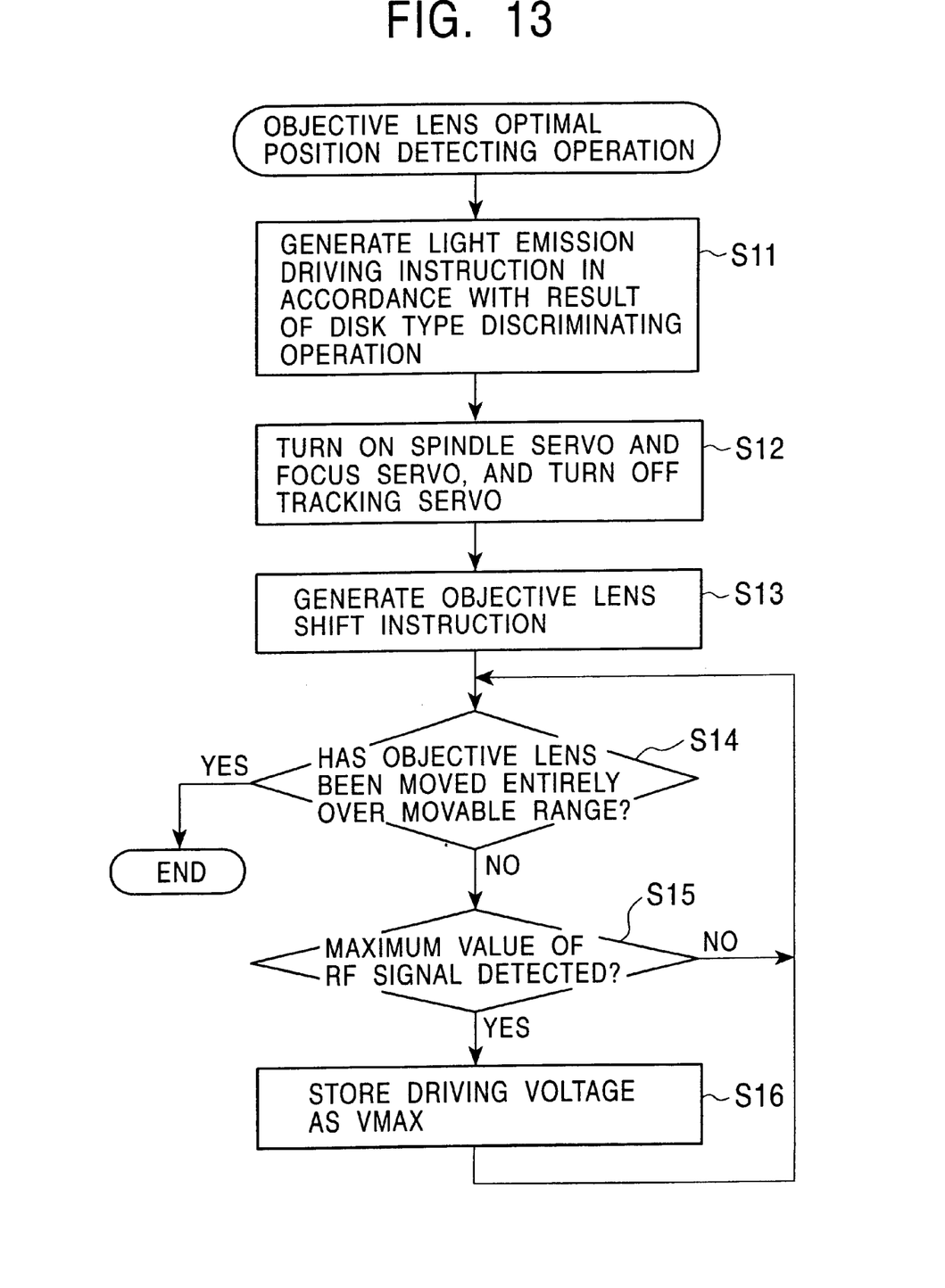
FIG. 13 is a flow chart illustrating an objective lens optimal position detecting operation.

For playing the disk 1, after the termination of the disk type discriminating operation, the system control circuit 6 performs an objective lens optimal position detecting operation for moving the objective lens 25 in the disk radial direction for adjustment to provide the maximum RF signal Rf.

In the objective lens optimal position detecting operation, the system control circuit 6 first generates a light emission driving instruction in accordance with the result of the disk type discriminating operation (step S11), as illustrated in FIG. 13. When the disk 1 is discriminated to be a DVD, the driver 67 is supplied with the light emission driving signal. Thus, in response to the light emission driving instruction, the driver 67 supplies a driving current between the electrodes 34, 46 of the first light emitter 31 of the semiconductor laser device 21, thereby emitting the first laser beam from the light emitting point A1 of the first light emitter 31. When the disk 1 is discriminated to be a CD, the driver 68 is supplied with the light emission driving instruction. Thus, in response to the light emission driving instruction, the driver 68 supplies a driving current between the electrodes 34, 56 of the second light emitter 32 of the semiconductor laser device 21, thereby emitting the second laser beam from the light emitting point A2 of the second light emitter 32.

After execution of step S11, the system control circuit 6 turns on the spindle servo control, turns on the focus servo control, and turns off the tracking servo control (step S12). Specifically, the switches 75 and 82 are turned on, and the switch 77 is turned off. Since the focus servo control and the spindle servo control are operative, the disk 1 is driven to rotate, and the spot of a beam spot by the emitted laser beam is adjusted on the recording surface 1a of the disk 1. Further, the system control circuit 6 generates an objective lens shifting instruction to a voltage applying circuit 19 in the servo control circuit 5 (step S13). In response to this objective lens shifting instruction, the voltage applying circuit 19 supplies the driver 9 with a gradually changing driving voltage through the adder 20. In this way, the driver 9 drives the objective lens 25 through the tracking actuator to move the objective lens 25 within a movable range in the disk radial direction.

After execution of step S13, the system control circuit 6 determines whether or not the objective lens 25 has been moved entirely over the movable range thereof (step S14). If the objective lens 25 has not been moved entirely over the movable range thereof, the maximum value of the RF signal RF detected by a maximum value detector circuit 40 is monitored to determine whether or not the maximum value of the RF signal Rf is detected (step S15). When the maximum value is detected, a driving voltage from the voltage applying circuit 19 when the maximum value is found is stored in a memory, not shown, as VMAX (step S16). Then, returning to step S13, the movement of the objective lens 25 is continued. On the other hand, when it is determined at step S14 that the objective lens 25 has been moved entirely over the movable range thereof, the objective lens optimal position detecting operation is terminated. The driving voltage VMAX stored at this time is the maximum value of the actual RF signal Rf within the entire movable range of the objective lens 25.

The RF signal Rf is increased or decreased in accordance with the distance between the optical axis of the objective lens 25 and the center of the Gaussian distribution. Specifically, the RF signal Rf is lower as the distance is larger. Also, apart from the distance, the RF signal Rf differs when the position of the beam spot on the disk is on track and when it is off track. Specifically, RF signal Rf is larger at a position of off-track than on-track. However, since the spindle servo control functions to drive the disk 1 to rotate while the tracking servo control is off, on-track and off-track randomly occur in the position of the beam spot. Therefore, a temporal average level of the RF signal Rf is hardly affected by on-track and off-track during the objective lens optimal position detecting operation. As a result, the distance between the optical axis of the objective lens 25 and the center of the Gaussian distribution of the laser beam can be determined from the magnitude of the RF signal Rf, and a shifted position of the objective lens 25, at which the center of the laser beam is substantially aligned with the optical axis of the objective lens 25 by the objective lens optimal position detecting operation, can be detected as the driving voltage VMAX.

During reproduction of the disk 1, the system control circuit 6 selects the emitted laser beam of the semiconductor laser device 21 in accordance with the type of the disk 1 found in the disk type discriminating operation. Also, the voltage applying circuit 19 is forced to generate the driving voltage VMAX, the spindle servo control is turned on, the focus servo control is turned on, and the tracking servo control is turned on. When the disk 1 is a DVD, the semiconductor laser device 21 emits the first laser beam having the wavelength of 650 nm. The objective lens 25 is moved to a first position corresponding to the driving voltage VMAX such that the optical axis of the objective lens 25 aligns substantially with the center of the first laser beam. On the other hand, when the disk 1 is a CD, the semiconductor laser device 21 emits the second laser beam having the wavelength of 780 nm. The objective lens 25 is moved to a second position corresponding to the driving voltage VMAX such that the optical axis of the objective lens 25 aligns substantially with the center of the second laser beam.

In the tracking servo control, the driving voltage VMAX is generated from the voltage applying circuit 19, and the driving voltage VMAX is added as an offset voltage to a tracking driving signal TD from the equalizer 76 in the adder 20. The addition result by the adder 20 is supplied to the driver 9 as the tracking driving signal TD to drive the tracking actuator. Thus, the tracking servo control is performed with the amount of movement of the objective lens 25 in the disk radial direction by the offset voltage as a reference position.

A mechanical neutral point of the tracking actuator may be set in the middle of the reference position of the objective lens 25 when the disk 1 is a DVD and the reference position of the objective lens 25 when it is a CD, such that the objective lens 25 is moved in the opposite direction in the case of the CD by substantially the same amount as the amount by which the objective lens 25 is moved in the case of the DVD. Alternatively, the mechanical neutral point of the tracking actuator is made coincident with the reference position of the objective lens 25 when the disk 1 is DVD, and the objective lens 25 may be moved in the disk radial direction by the offset voltage in the case of the CD. In other word, since signal detection in the pickup apparatus is more difficult when a laser beam at a shorter wavelength is used, no offset voltage is provided in the case of the DVD.

In the foregoing embodiment, the objective lens 25 is actually moved in the disk radial direction to detect a position at which the RF signal Rf takes the maximum value for each set disk 1. Alternatively, the position of the objective lens may be previously set for each of the DVD and the CD, such that the objective lens is moved to the previously set position in accordance with the result discriminated by the disk type discriminating operation, without detecting the maximum value of the RF signal Rf. Alternatively, while the RF signal Rf is monitored for moving the objective lens to the optimal position, the error rate of the RF signal may be monitored to move the objective lens to a position at which this is minimized.

Figure 14:
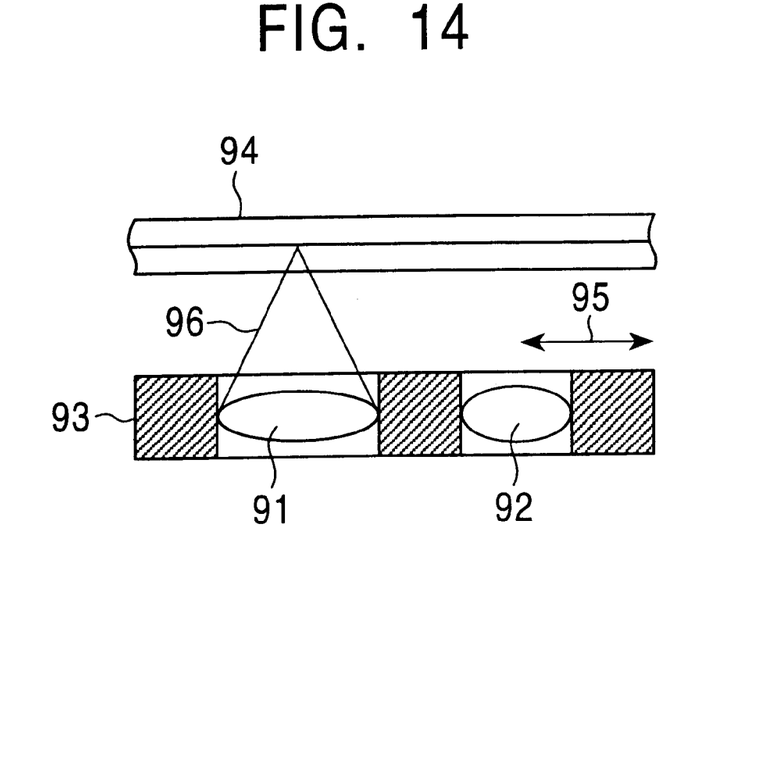
FIG. 14 is a cross-sectional view showing when a DVD objective lens is selected from two objective lenses.
Figure 15:
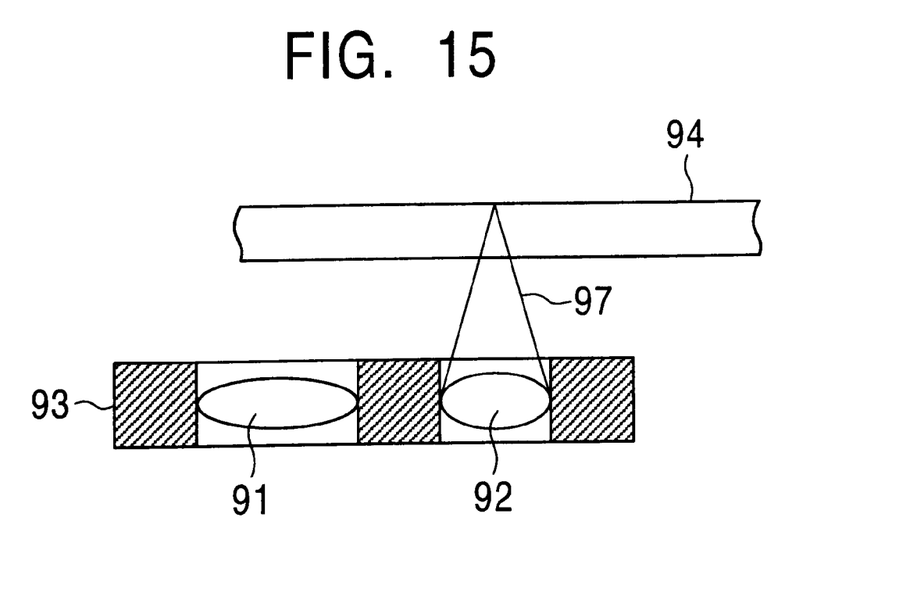
FIG. 15 is a cross-sectional view showing when a CD objective lens is selected from the two objective lenses.

Also, in the foregoing embodiment, the objective lens 25 is a bifocal lens and can be used when the disk 1 is either a DVD or a CD, different objective lenses from each other may be used for a DVD and a CD. In the configuration of this case, for example, as illustrated in FIG. 14, an objective lens 91 for DVD and an objective lens 92 for CD are attached to a lens holder 93 such that the respective optical axes are in parallel. The lens holder 93 is driven by driving means, not shown, to move in a direction of an arrow 95. When a disk 94 is a DVD, the lens holder 93 is moved such that the center of an irradiated first laser beam 96 having a wavelength of 650 nm is aligned with the optical axis of the objective lens 91 for DVD, as illustrated in FIG. 14. When the disk 94 is a CD, the lens holder 93 is moved such that the center of an irradiated second laser beam 97 having a wavelength of 780 nm is aligned with the optical axis of the objective lens 92 for CD, as illustrated in FIG. 15. Since a mechanism for switching two objective lenses in accordance with the type of a disk is disclosed in detail in Laid-open Japanese Patent Application No. 10-112057, so that detailed description is omitted here.

Also, while the foregoing embodiment has been described for the case where the present invention is applied to an infinite optical system using the collimator lens 24, the present invention may be applied to a finite optical system.

Also, while in the foregoing embodiment, the focus servo control is performed in accordance with an astigmatism method and the tracking servo control is performed in accordance with a three-beam method, known methods may be employed without limited to these. In addition, the same method need not be employed for playing a CD and a DVD. For example, the tracking servo control for CD may be performed in accordance with the three-beam method, DVD in accordance with a phase-differential method, and so on.

Further, while in the foregoing embodiment, the semiconductor laser device comprises two light emitting points at different light emitting wavelengths, the present invention may be applied to a semiconductor laser device which comprises three or more light emitting points at different light emitting wavelengths from one another. Also, the semiconductor laser device is not limited to that having two integrally formed light emitters as in the foregoing embodiment, but one having two independently formed light emitters for emitting laser beams having wavelengths which are different from each other may be used.

As described above, according to the present invention, optics such as a combining prism need not be used, and the optical system can be intensively arranged in compact, as compared with the prior art, so that the optical pickup apparatus can be simplified in configuration and reduced in size. Also, since the objective lens is moved to one of a plurality of positions different from one another in the radial direction of an optical disk corresponding to a light emitter selected from a plurality of light emitters, the intensity of a laser beam irradiated to the recording surface of the optical disk can be set in an appropriate condition even if a light emitting points of laser beams of the respective light emitters are slightly spaced.

What is claimed is:

1. An optical pickup apparatus comprising:
   a light emitting device having a plurality of light emitting portions for emitting laser beams having different wavelengths on a substrate, for emitting a laser beam from one light emitting portion selected from said plurality of light emitting portions in the same emitting direction in response to a light emitter selecting instruction;
   at least one objective lens for converging the laser beam emitted from said light emitting device to irradiate a recording surface of an optical disk; and
   a lens driving device for moving said objective lens to one position within a plurality of different positions from one another in a radial direction of said optical disk, corresponding to the light emitting portion selected by said light emitter selecting instruction.

2. An optical pickup apparatus according to claim 1, wherein said lens driving device has a tracking actuator for moving said objective lens to a position corresponding to a supplied voltage level, and supplies the tracking actuator with an offset voltage having a level corresponding to said light emitter selecting instruction.

3. An optical pickup apparatus according to claim 1, wherein said lens driving device moves said objective lens to a position at which an optical axis of said objective lens is aligned with the center of a Gaussian distribution of the laser beam emitted from said one light emitting portion.

4. An optical pickup according to claim 2, wherein at a mechanical neutral point of said tracking actuator, the optical axis of said objective lens is aligned with the center of the Gaussian distribution of a laser beam having a short wavelength of laser beams emitted respectively from said plurality of light emitting portions, and said tracking actuator actuates to other than said mechanical neutral point in accordance with an offset voltage when said light emitter selecting instruction indicates a light emitting portion for emitting a laser beam having a long wavelength.

5. An optical pickup apparatus according to claim 1, comprising a plurality of objective lenses including said objective lens, wherein said lens driving device moves one of said plurality of objective lenses in response to said light emitter selecting instruction such that an optical axis of said one objective lens is aligned with the center of the Gaussian distribution of the laser beam emitted from said one light emitting portion.

* * * * *